United States Patent [19]

Swift

[11] 4,188,423

[45] Feb. 12, 1980

[54] SOLVENT EXTRACTED HEAT FUSER MEMBER

[75] Inventor: Joseph A. Swift, Ontario, N.Y.

[73] Assignee: Xerox Corporation, Stamford, Conn.

[21] Appl. No.: 784,999

[22] Filed: Apr. 6, 1977

[51] Int. Cl.$^2$ .......................... B05D 3/04; B05D 3/10; G03G 15/20

[52] U.S. Cl. ...................................... 427/444; 29/132; 427/335; 427/336; 427/352; 428/447; 428/450; 528/491; 528/493; 528/494; 528/495; 528/497; 528/498; 355/3 FU

[58] Field of Search ................. 427/335, 336, 352, 22, 427/340, 444; 264/344; 528/493, 494, 495, 497, 498, 491; 29/132; 447/450

[56] References Cited

U.S. PATENT DOCUMENTS

| | | | |
|---|---|---|---|
| 2,714,099 | 7/1955 | Weyenberg | 260/46.5 |
| 2,716,638 | 8/1955 | Cohen | 260/46.5 |
| 3,183,205 | 5/1965 | Bailey et al. | 260/37 |
| 3,183,209 | 5/1965 | Hartung et al. | 260/46.5 |
| 3,350,216 | 10/1967 | McVannel et al. | 428/447 |
| 3,666,247 | 5/1972 | Banks | 219/388 |
| 3,848,305 | 11/1974 | Jachimiak | 29/132 |
| 3,987,530 | 10/1976 | Atkin et al. | 29/132 |
| 3,997,691 | 12/1976 | Murphy | 29/132 |
| 4,000,339 | 12/1976 | Murphy | 29/132 |

OTHER PUBLICATIONS

Kirk–Othmer, *Encyclopedia of Chemical Technology*, (2nd Revised Edition), vol. 18 (1969, pp. 221-250).

*Primary Examiner*—Ronald H. Smith
*Assistant Examiner*—Stuart D. Frenkel
*Attorney, Agent, or Firm*—Ernest F. Chapman

[57] ABSTRACT

Fuser members coated with a release layer of silicone rubber are treated with a solvent to remove low molecular weight siloxanes, polysiloxanes and other impurities from the silicone rubber. The solvent must be one which removes or extracts the low molecular weight siloxanes, polysiloxanes and other impurities without dissolving or otherwise adversely effecting the integrity of the silicone rubber layer coated upon a base member. Generally solvent extraction is continued until the components in the cured silicone rubber which interfer with the release properties of the rubber in releasing toner from the fuser member surface, are depleted to concentration where they do not inhibit release of the toner.

9 Claims, No Drawings

SOLVENT EXTRACTED HEAT FUSER MEMBER

BACKGROUND OF THE INVENTION

This invention relates generally to members utilized for pressure fusing toners at elevated temperatures, and more particularly to a process for improving the ability of heat fixing rolls to release toner and the substrates to which it is applied from the fuser member surface.

In the process of electrophotographic copying a light image of an original to be copied is typically recorded in the form of a latent electrostatic image upon a photosensitive member with subsequent rendering of the latent image visible by the application of electroscopic particles, commonly referred to as toner. The visual toner image can be either fixed directly upon the photosensitive member or transferred from the member to another support, such as a sheet of plain paper, with subsequent affixing of the image thereto. Toners are well known in the art and may be of various types.

In order to affix or fuse electroscopic toner material onto a support surface permanently by heat, it is necessary to elevate the temperature of the toner material to a point at which the constituents of the toner material coalesce and become tacky. This action causes the toner to flow to some extent into the fibers or pores of support sheets or members or otherwise upon the surface thereof. Thereafter, as the toner material cools solidification of the toner material occurs causing the toner material to be bonded firmly to the support sheet or member. In both xerographic as well as the electrographic recording arts, the use of thermal energy for fixing toner images onto a support member is old and well known.

Several approaches to thermal fusing of electroscopic toner images onto a support have been described in the prior art and include providing the concomitant application of heat and pressure as by a roll pair maintained in pressure contact, a flat or curved plate member in the pressure contact with a roll, a belt member in pressure contact with a roll, and the like. Heat may be applied by heating one or both of the rolls, plate members or belt members. The fusing of the toner takes place when the proper combination of heat, pressure and contact time are provided, the balancing of these parameters being well known in the art and varying according to various factors which must be independently determined for each particular situation.

During operation of a fusing system of the type where there is a thermal fusing of electroscopic toner images onto a support in which at least one fuser member, such as a roll, plate, or belt, is heated, the support member to which the toner images are electrostatically adhered, is moved through the nip formed between the members with the toner image pressure contacting the fuser member thereby to effect heating of the toner images within the nip. By controlling the heat transfer to the toner, virtually no offset of the toner particles from the copy sheet to the fuser member is experienced under normal conditions. This is because the heat applied to the surface of the fuser member is insufficient to raise the temperature of the surface of the member above the "hot offset" temperature of the toner at which temperature the toner particles in the image areas of the toner liquify and cause a splitting in the molten toner resulting in "hot offset." Splitting occurs when the cohesive forces holding the viscous toner mass together is less than the adhesive forces tending to offset it to a contacting surface such as a fuser roll, fuser belt, or fuser plate.

Occasionally, however, toner particles will be offset to the fuser roll by an insufficient application of heat to the surface thereof (i.e. "cold" offsetting); by imperfection in the properties of the surface of the roll; by the toner particles insufficiently adhering to the copy sheet; by the elctrostatic forces which normally hold them there; or in certain cases by the reactivity of the toner material itself. In such a case, toner particles may be transferred to the surface of the fuser member with subsequent transfer to the backup member which provides pressure contact, during period of time when no copy paper is in the nip.

In many of these pressure contact, heat fixing systems, a heated member, e.g. a roll, provided with a covering of a heat-resistant, releasing material on the outer surface thereof is contacted with a back-up or pressure roll covered with a heat-resistant, flexible material layer under the nip pressure, between which the sheet to be fixed is passed for fixing the toner image.

As an example of the heat-resistant, release material for the fuser member, there are well known materials such as polytetrafluoroethylene, silicone rubber, fluorocarbon elastomers and the like. In certain cases, a suitable off-set preventing liquid is fed onto the fuser member to minimize or avoid such problems as "offsetting." Silicone oils are widely applied as the off-set preventing liquid.

In the pressure contact heat fixing device of the type described above, the fuser member is covered with a certain thickness of heat-resistant silicone rubber which releases toner material and has an elastic, compressible surface. When silicone rubber is used as the outer layer of the fuser member, the fused image has excellent quality.

The silicone rubbers which can be used as the outer layer coating the base or core of the fuser member, can be classed into three groups according to vulcanization method and temperature, i.e., room temperature vulcanization-type silicone rubber, hereinafter referred to as RTV silicone rubber, low temperature vulcanization-type silicone rubber hereinafter referred to as LTV rubber, and high temperature vulcanization-type silicone rubber, hereinafter referred to as HTV rubber. These silicone rubbers are well known in the art and are commercially available.

When employed as a fuser member covering material, the HTV and LTV silicone rubbers are generally superior in releasing property to the RTV silicone rubber and thus generally produce favorable results in fusing toner images. The RTV silicone rubbers now commercially available exhibit release of toner images for about 5,000 to 30,000 copies fused by heat. Thereafter, there is a tendency for the offset problem and winding of copying paper about the fuser roll to occur. When this occurs, it is usually necessary to replace the used fuser roll.

To overcome the foregoing problems it is well known that fluid release agents, for example, oil, may be applied to the surface of the fuser member (upon the silicone rubber layer) as an off-set preventing liquid during fixing operations. However, when silicone rubber is used as a heat-resistant, release layer to cover the fuser member, the use of a silicone oil is disadvantageous in that the silicone rubber is susceptible to swelling by the action of the silicone oil, so that the oil readily penetrates the rubber, resulting in separation in some cases of the rubber from a base or core. Thus, the application of silicone oil is effective in improving the release characteristics, but it sacrifices the durability of the silicone rubber layer covering the fuser member. For this and other reasons, silicone rubber coated fuser members have a short life and generally permit no more than about 30,000 fusing cycles per fuser member. Adhesives, primers, and other reactive polymers have been successfully used to overcome this disadvantage, but the use of such materials requires additional manufacturing steps and introduces additional layers of coatings on the fuser member.

To overcome the disadvantages of using silicone oil or other release agents upon the silicone rubber coated fuser members, it has been suggested in U.S. Pat. No. 3,848,305 that a fuser roll having a cylindrical core and a coating of a silicone elastomeric material on the core be improved by a simultaneous combination treatment of heating the coated roll structure to a temperature above the normal operating temperature of the roll and subjecting the roll and coating to a high vacuum during the heating process. The patentee suggests that this accelerates the removal of cyclic siloxanes and enhances the breakdown by any metastable cross-links which would otherwise result in cyclic siloxanes liberation later in service in the fuser apparatus thus adversely effecting release. Thus, according to the patentee, the fuser roll is coated with a silicone elastomer and heat and vacuum cured to remove the cyclic siloxanes to a state of constant weight loss to improve the release of paper and toner from the roll surface. This technique has several disadvantages which include the fact that such a technique requires considerable equipment and is not easily carried out in a manufacturing assembly line. Furthermore, the use of such a technique does not result in the removal of substantially all impurities because there is a tendency for the lower molecular weight polysiloxanes to partially polymerize and cross-link under the curing conditions in vacuum before they can be removed from the silicone rubber layer undergoing curing. Later, under operating conditions in the presence of heat and moisture, these siloxanes may have a tendency to degrade into undesirable degradation products, namely, lower molecular weight quasi-adhesive polysiloxanes. The simultaneous heat/vacuum cure can also promote the dislodging of the gum or rubber from the base member and thereby effect the integrity of the cured rubber relative to its adhesion to the base member. The simultaneous heat/vacuum cure also requires expensive and complicated equipment and processing when commerical quantities are involved.

OBJECTS OF THE INVENTION

Accordingly, it is the primary object of this invention to overcome the foregoing disadvantages.

It is another object of this invention to provide an improved silicone rubber coated fuser member having not only cyclic siloxanes removed from the silicone rubber but also other low molecular weight siloxanes, polysiloxanes and/or other impurities therefrom.

Still another object of the present invention is to provide a process for extracting siloxanes, low molecular weight polysiloxanes and/or other impurities from silicone rubber coated fuser members.

It is an additional object of the present invention to provide a method of removing low molecular weight polysiloxanes, siloxanes and/or other impurities from the silicone rubber surface layer secured upon a base member without damaging or otherwise compromising the integrity of the adhesion between the silicone rubber and the base member.

SUMMARY OF THE INVENTION

The above-cited objects of the present invention are accomplished by subjecting the cured silicone rubber layer coated upon a base member, such as a cylindrical roll, to a solvent extraction to remove siloxanes, polysiloxanes and/or other impurities from the silicone rubber. The solvent extraction of the already-cured silicone rubber layer or layers coated upon a base member can be carried out by any of several solvent extraction techniques well known in the prior art.

The solvent which is used to extract the low molecular weight polysiloxanes, siloxanes and/or other impurities from cured silicone rubber, materials which tend to act as adhesive materials with toner and/or the substrates to which toners are fused, must be chosen from generally conventional lists of solvent materials which do not react with, degrade or dissolve the silicone rubber. Generally the solvent must be one which removes components which interfere with the release properties of the silicone rubber, from the silicone rubber. More specifically, the solvent must be one which dissolves low molecular weight polysiloxanes, siloxanes and/or other impurities, including linear, branched and cyclic, without dissolving the silicone rubber, without compromising the integrity of the silicone rubber layer or layers adhering to a base member, and without having any other adverse effect upon the fuser member or its release properties when it is later used in a fuser apparatus.

Solvent as used herein encompasses vapors, fluids or liquids, and combinations thereof. The solvents may be used at room temperature or at elevated temperatures. The solvents may be applied to the silicone rubber layer by a means which circulates the solvent or by a means wherein the silicone rubber layer remains in a static exposure to the solvent, for example, by immersing in an uncirculating bath of the solvent, or by maintaining the silicone rubber layer in a chamber of solvent in the vapor state, or by any of the well-known reflexing techniques.

Although the invention has general application in treating a cured or vulcanized silicone rubber surface layer adhered to a base member in the form of a fuser member, it may also be used to remove low molecular polysiloxanes, siloxanes and/or other impurities from other base members coated with a silicone rubber or other elastomers wherein the integrity between the rubber layer and the base member must not be compromised or otherwise damaged.

These as well as other objects of the invention and further features thereof will be better understood upon reference to the following detailed description of the invention.

DESCRIPTION OF THE PREFERRED EMBODIMENTS

The solvent extraction technique may be used upon any fuser member or other base member which has a coating of cured silicone rubber layer or layers thereon. The extraction method is particularly advantageous and has been tested upon fuser roll embodiments which are well known in the prior art. The treated fuser rolls of the present invention may be used in any electrostatographic reproducing or duplicating machine which uses a material which must be fused by heat to develop an image. Exemplary of the fuser embodiments of the present invention are those describing automatic xerographic reproducing machines described in U.S. Pat. Nos. 3,645,615 and 3,937,637, said patents being incorporated herein by reference. Therein is illustrated a reproducing machine which employs an image recording drum-like member, the outer periphery of which is coated with a suitable photoconductive material. One type of photoconductive material is disclosed in 2,970,906 issued to Bixby in 1961. The photoconductive drum is suitably journaled for rotation within a machine frame by means of a shaft which rotates to bring the image retaining surface thereon past a plurality of xerographic processing stations. Suitable drive means are provided to power and coordinate the motion of the various cooperating machine components whereby a faithful reproduction of the original input scene information is recorded upon a sheet of final support material such as paper or the like.

Since the practice of xerography is well known in the art, the various processing stations for producing a copy of an original are represented as stations A to E. Initially, the drum moves the photoconductive surface through a charging station A. At charging station A an electrostatic charge is placed uniformly over the photoconductive surface of the drum preparatory to imaging. The charging may be provided by a corona generating device of a type described in U.S. Pat. No. 2,836,725 issued to Vyverberg in 1958.

Thereafter, the drum is rotated to exposure station B where the charged photoconductive surface is exposed to a light image of the original input scene information, whereby the charge is selectively dissipated in the light exposed regions to record the original input scene in the form of a latent electrostatic image. A suitable exposure system may be provided by one skilled in the art.

After exposure the photoconductive drum rotates the electrostatic latent image recorded on the photocnductive surface to development station C, wherein a conventional developer mix is applied to the photoconductor surface rendering the latent image visible. A suitable development station may include a magnetic brush development system utilizing a magnetizable developer mix having carrier granules and toner comprising electrophotographic resin plus colorant from dyes or pigments. A developer mix is continuously brought through a direction flux field to form a brush thereof. The electrostatic latent image recorded on the photoconductive surface is developed by bringing the brush of developer mix into contact therewith. The developed image on the photoconductive surface is then brought into contact with a sheet of final support material within a transfer station D and the toner image is transferred from the photoconductive surface to the contacting side of a final support sheet. The final support material may be plain paper, gummed labels, transparencies such as polycarbonate, polysulfone and Mylar, etc., as desired.

After the toner image has been transferred to the sheet of final support material, the sheet with the image thereon is advanced to a suitable fuser assembly which fuses the transfer powder image thereto. After the fusing process, the final support material is advanced by a series of rolls to a copy paper tray for subsequent removal therefrom by a machine operator.

Although most of the toner powder is transferred to the final support material, some residual toner remains on the photoconductive surface after the transfer of the toner powder image to the final support material. The residual toner partilces remaining on the photoconductive surface after the transfer operation are removed from the drum as it moves through cleaning station E. Here the residual toner particles may first be brought under the influence of a cleaning corona generating device adapted to neutralize the electrostatic charge remaining on the toner particles. The neutralized toner particles are then mechanically cleaned from the photoconductive surface by conventional means as for example, the use of a resiliently biased knife blade. Other cleaning modes may be used at cleaning station E as desired by one skilled in the art.

It is believed that the foregoing description is sufficient for purposes of the present application to illustrate the general operation of a preferred automatic xerographic copier which can embody the teachings of the present invention.

As discussed above, fuser assemblies include cylindrical roll, flat plates, curved plates, belts and the like having at least an outer surface of silicone rubber.

For the sake of illustration of the preferred embodiments, the description of materials and procedures will be made with respect to a high temperature vulcanizable (HTV) silicone rubber which is a polydimethylsiloxane material containing vinyl groups, the gum having been cured in the presence of benzoyl peroxide catalyst. The particular vinyl-containing polydimethylsiloxane contains 0.57 weight percent vinyl groups and was identified as product No. X4-2589u, a material supplied by Dow Corning Corporation. The gum rubber containing the benzoyl peroxide was dissolved in toluene and coated upon a roll substrate. The solvent, toluene, was evaporated in air over a period of twenty-four hours. The silicone gum was cured by heating in the absence of air at a temperature of 290° F. (143° C.). Following this vulcanization step, the coated roll was allowed to cool prior to the initiation of the solvent extraction in accordance with the instant invention. Other vulcanized or cured silicone rubbers behave in the same or similar manner, and the procedures taught herein are also applicable to said other cured silicone rubbers.

The cured silicone rubbers contain various low molecular polysiloxanes, uncured siloxanes and other impurities, all of which compromise the integrity of the silicone rubber, that is, which reduce its strength and durability and which can eventually cause a deterioration in either the bond between the silicone rubber layer and its base member or increase the wear out frequency of the bulk rubber. Some of these undesirable materials which are described as compromising the ability of the silicone rubber to release toner and/or the substrate to which the toner is applied in image configuration during the fusing operation in conventional electrostatographic fusing operations, are described in U.S. Pat. No. 3,848,305. Therein is disclosed a class of cyclic siloxanes which are left in the silicone rubber due to incomplete cross-linking or vulcanization. These can be removed according to the teachings of U.S. Pat. No. 3,848,305 by curing the silicone rubber at elevated temperatures in a vacuum system because they are volatile materials which can be removed under such conditions. However, other materials which are incompletely cross-linked or vulcanized and other materials which are incapable of undergoing cross-linking or vulcanization remain in the silicone rubber. Many of these materials are not easily removed in vacuum under heat without applying sufficient heat to decompose the silicone rubber. Thus, they must be removed by some other technique, and in accordance with the instant extraction technique, such materials along with the cyclic siloxanes are removed by selected solvents. These include lower molecular weight linear polysiloxanes, siloxanes and/or other impurities. Generally, the components of the cured silicone rubber which are most desirably removed, are components which interfere with the release properties of the silicone rubber, especially those components which are tacky and have quasi-adhesive properties.

The solvents which are useful in the process of the present invention for preparing extracted fuser rolls must be liquids or vapors which are non-solvents for cured or vulcanized silicone rubbers. Accordingly, liquids and vapors, especially organic liquids and vapors which are known to dissolve silicone rubber, to react with silicone rubber, or to degrade silicone rubber, cannot be used in the instant process. The solvents are preferably organic liquids and vapors which extract the components which interfere with the release properties of the rubber, for example, low molecular weight polysiloxanes, siloxanes and other impurities without dissolving or adversely effecting the integrity of the cured or vulcanized silicone rubber layer coated upon a base member. The siloxanes which are removed by the solvent, include un-reacted and/or uncross-linked siloxane materials resulting from the degradation of the silicone gum during heating and/or curing or vulcanization. The low molecular weight polysiloxanes are those linear and branched siloxanes with only a few Si-O units per chain, for example, from about 2 to 30 Si-O units per chain. Many of these materials are tacky and have an adhesive effect upon toner, paper, and other substrates. Other impurities may include degraded fillers, residual catalyst, and the like. Generally, the solvents of the present invention must be one which does not remove fillers and other additives which are incorporated in the silicone rubber material for various purposes as well-known in the art. Thus, in each circumstance, the fillers and other materials containined in the silicone rubber should be examined, and the solvent should be selected such that these materials will not be dissolved and removed from the silicone rubber with a resultant weakening of the properties of this cured silicone rubber.

Typical of the solvents which may generally be employed in accordance with the extraction technique of the present invention are the ethers such as methyl ethyl ether, diethyl ether, dioxane and the like; alkanes or paraffinic hydrocarbons which are either liquids or vapors at room temperature or elevated temperatures, for example, pentadecane, hexadecane, octadecane, eicosane, and the like; halogen derivatives of hydrocarbons, for example isobutyl chloride, tertiary-butyl chloride, trichloroethylene, dichloroethylene, chloroform, carbon tetrachloride, and the like; aromatic hydrocarbons such as toluene, benzene, cyclohexane and the like; aldehydes and ketones such as acetaldehyde and acetone and the like; and other organic and inorganic fluids and vapors which dissolve siloxanes, low molecular weight polysiloxanes and other impurities found in cured silicone rubber without dissolving or degrading the cured or vulcanized silicone rubber.

Many solvents which cannot be used in accordance with the present invention in extracting the siloxanes, low molecular weight polysiloxanes and other impurities from cured or vulcanized silicone rubbers, can be ascertained by examining the literature which illustrates solvents which react with or substantially swell, or which have some other adverse impact or effect upon cured or vulcanized silicone rubber such as difficulty in removing all residual or trace amounts of the solvent. For example, strong aqueous or alcoholic alkaline solutions such as KOH, NaOH, and the like are well known degradation catalysts for silicone rubber. Ethylene diamine and other strong organic acids or bases can react with or degrade the Si-O, Si-C, or C-H bonds, and are generally deemed to have an adverse effect upon the integrity of the cured or vulcanized silicone rubber. Other such solvents which cannot be used to extract the cured or vulcanized silicone rubber in accordance with the present invention can be easily determined by one skilled in the art without undue experimentation.

The solvents used to extract the siloxanes, low molecular weight polysiloxanes and other impurities from the cured or vulcanized silicone rubber in accordance with the present invention may be used at various temperatures. In preferred embodiments, the solvents are used at either room temperature or slightly elevated temperatures. In certain cases where solvents have melting points which are near or above room temperature, the solvent must be heated in order to extract the cured or vulcanized silicone rubber material. Super heated vapors can also be used in accordance with the present invention.

The length of time the extraction process is carried out depends upon many factors including the particular solvent or solvents used, the temperature of the solvent, the thickness of the silicone rubber layer or layers, the mode of extraction and the like. The length of time generally varies from about 2 hours to about 24 hours depending upon the foregoing factors, however, the length of time of the extraction process should not be limiting. In the preferred embodiments, extraction is deemed complete when the release performance of the silicone rubber is noticeably improved. Thus, the length of time to completion of extraction may be that period of time required to extract that amount of the components which interfere with the release properties of the silicone rubber, from the silicone rubber.

As used herein, "release properties" is the ability of the silicone rubber to release a substrate in contact therewith and in fusing modes includes molten thermoplastic toners well-known in the art. The silicone rubber layer is said to be abhesive to the substrate when it releases the substrate.

The extraction may be carried out in any suitable manner which exposes the cured or vulcanized silicone rubber material coated upon a base member to the liquid or vapor medium which extracts the components which interfere with the release properties of the rubber, e.g., siloxanes, low molecular weight polysiloxanes or other impurities from the rubber. Exemplary of these techniques are immersion of the coated member in a bath of the solvent, placing the coated member within a chamber containing vapors of the solvent, rotating the coated member so that it is completely or partially immersed in the solvent, spraying the solvent either in the form of a liquid or vapor upon the silicone rubber coating, dipping the coated base member in the solvent, brushing, padding or otherwise metering the solvent upon the coated base member and the like. Of the foregoing techniques, the most preferred embodiment is extracting the silicone rubber layer by placing the coated base member in a Soxhlet-type extracting chamber in which vapors of the solvent are circulated into and condense therein until the chamber in which the coated base member is placed is sufficiently full of condensed solvent to immerse completely the coated base member in the condensed solvent. When the solvent reaches a predetermined level, the fluid together with extracted soluble matter is removed from the condensation chamber and returned to a boiling chamber where pure vapors of the solvent are generated and pass back into the condensation chamber containing the base member. This process (a reflux technique) is continued as many times as desired, and more preferably until all of the components which interfere with release, e.g., siloxanes, low molecular weight polysiloxanes and other impurities, are removed from the cured or vulcanized silicone rubber layer. This can be determined by well-known constant weight loss measurements, and when there is substantially little additional weight loss in the member being extracted, the extraction technique can be terminated, or it can be determined by the release performance of the silicone rubber. In this type of extraction technique, generally from about 4 to about 24 hours are preferred depending upon the particular solvent and the efficiency of the vapor. The solvent is removed from the member, generally by air or vacuum drying, after extraction is complete.

Naturally, this technique also lends itself to a postcuring operation. For example, when the previously-cured or vulcanized silicone rubber coating upon the base member is subjected to additional heat in the presence of the solvent material, the curing operation, that is, cross-linking which was previously incomplete, can be carried to further completion by the additional heat. Thus, in certain case it may be preferred to heat the solvent material at a temperature which will carry out a post-cure of the silicone rubber. Such temperatures are generally deemed to be from about 100° F. (37° C.) to about 500° F. (260° C.) in the length of time at which the extraction is completed. Furthermore, post-cured silicone rubber coated members can be extracted in accordance with the present invention.

The extraction technique of the present invention may be carried out with a single solvent or a mixture of solvents including an azeotropic mixture. The components which interfere with release, e.g., the low molecular weight components, the siloxanes and other impurities in the rubber layer become solubilized in the solvent material which penetrates into the silicone rubber layer. Once solubilized, the components which interfere with the rubber-release properties, e.g., the low molecular weight components, the polysiloxanes and/or impurities migrate from the silicone layer in dissolved or swollen form to the surface of the cured or vulcanized silicone rubber layer. Thereafter, they are washed away or further diluted in the environment surrounding the coated member. Generally, it is more expedient to change the solvent medium surrounding the coated member to render the extraction more efficient.

As discussed above, the coated member may be used as a fuser member, for example a fuser roll, and when used as a fuser member, it may be used in conjunction with a release agent coated upon the surface of the extracted, cured silicone rubber layer or it may be used without a release agent. A typical release agent is silicone oil. Regardless of the mode in which the fuser member is utilized, that is, with or without a release agent, performance of the roll is superior because the extraction technique has removed the components which interfere with the release properties of the rubber, e.g., low molecular weight polysiloxanes, siloxanes and other impurities which tend to have adhesive or "tacky" properties for toner materials and/or the substrate to which toner materials are to be fused, for example, paper.

In accordance with the present extraction technique, it has been discovered that whatever materials are removed from the cured or vulcanized silicone rubber layer coating the member and which are generally present after the curing or vulcanization stage of preparation of the coated member, as well as degradation products normally formed during operation of the fuser member at elevated temperatures, improves the release properties of the roll whether or not it is used in conjunction with a release agent. Furthermore, the treatment does not alter or impair the integrity of the coating on the base member if the solvents are those which do not normally attack or dissolve cured or vulcanized silicone rubbers. Thus, the improved coated members have an extended life.

The coating and curing of silicone gum materials and the coatings of cured silicone rubber on base members are well known in the art, and conventional techniques for providing a cured or vulcanized silicone rubber on a base member are sufficiently well known in the prior art that detailed descriptions of the preparation of such members is not necessary in the instant case. Exemplary of the coating of a fuser member with a silicone rubber material is the disclosure found in U.S. Pat. Nos. 3,666,247 and 3,987,530. Numerous other references also disclose the coating of layers of silicone rubber on core members including fuser rolls. Briefly, in one embodiment a silicone gum material with or without a catalyst is dissolved in a suitable solvent and coated upon a metal roll, for example an aluminum cylinder. The coated roll is dried for about twenty-four hours at room temperature after which the curing or vulcanization is initiated by heating the silicone gum coating. For example, the silicone gum may be heated to about 150° F. (65° C.) for about five hours. Following the vulcanization step, the extraction process may be initiated at any time, and in preferred embodiments, the solvent extraction is carried out at an elevated temperature for a predetermined time period which is determined by the desired amount of material to be extracted from the vulcanized silicone rubber layer. Generally, in preferred embodiments from about 2 to about 24 hours is required for the extraction of the desired amount of the soluble materials in the vulcanized silicone rubber to improve significantly the release properties of the silicone rubber.

Having described the vulcanized silicone rubber extraction process and preferred assemblies in which the extracted members can be utilized, and having described several preferred extraction processes and techniques for improving the release properties of vulcanized silicone rubber coated upon base members, illustration will now be made of the performance of the extracted silicone members of the present invention, and the various improvements derived from the use of the extraction techniques which are representative of those of the present invention.

EXAMPLES

For comparative testing, four fuser members were made by applying a vinyl-containing polydimethylsiloxane gum having 0.57 weight percent vinyl groups substituted on the siloxane backbone, onto the outer surface of degreased aluminum cores at a thickness of 9.7 mils (249 microns). The HTV silicone gum was supplied by Dow Corning Corporation under the trade designation X4-2589u. A catalyst (2.0 parts per hundred) dicumyl peroxide supplied by Hercules Inc. under the trade designation Di-cup R, a vinyl specific catalyst was milled into the silicone gum, and the silicone gum was dissolved in toluene. The silicone gum solution was coated upon the surface of the aluminum cylinder and dried in air for twenty-four hours. The dried, coated rolls were then heated at 290° F. (142° C.) for thirty-one minutes to form a heat-resistant, silicone rubber layer upon the aluminum cylinders. The heating was carried out in a chamber in the absence of air.

For comparison, extracted and unextracted fuser rolls were then mounted in fuser assemblies comprising a backup roll in pressure engagement with the fuser roll. A heating element, a quartz lamp, was installed in the fuser roll cylinder and provided heat for fusing thermoplastic resin toner to a substrate, such as paper, as well-known in the art. The following tests were conducted and the results are set forth in Table I below. Roll A was not extracted and was used in the fuser assembly with 500 centistoke silicone oil as a release fluid. Roll B was extracted in accordance with the present invention by placing the coated roll in a Soxhlet extractor and extracting the roll with heated chloroform at 61.2° C. for twenty-four hours, the temperature of the extraction being carried out at the boiling point of the chloroform, the extraction taking place after the vulcanization of the silicone rubber upon the aluminum core. Roll B was used in conjuncation with a 500 centistoke (at 25° C.) silicone oil in the fuser assembly. Roll C was extracted with chloroform in the same manner and for the same length of time as Roll B and was used in the same fuser assembly without any release fluid. Roll D was not extracted and was used in the described fuser assembly without any release fluid. Table I below shows the number of copies to failure and the thickness of the coating on the roll in mils. The percentage of extractables is designated by percent E in the Table and is obtained from the ratio of the weight lost to the original weight multiplied by 100. The percent extractables was determined both prior to use in the fuser assembly and is designated in the table as initial properties and after use in the fuser assembly and is designated in the table as final properties. The swelling ratio was determined before and after fusing in each of the rolls and is not reported in the Table below because in each instance the swelling ratio varied between 3.5 and 3.8, the normal swelling ratio for this type of silicone rubber material in toluene.

TABLE I

| | | | FUSING TEST RESULTS | | | |
|---|---|---|---|---|---|---|
| FUSER ROLL | DESCRIPTION | RELEASE FLUID | INITIAL PROPERTIES THICKNESS | % E | FINAL PROPERTIES % E | COPIES TO FAILURE |
| A | Non Extracted | 500 CS | 8.5 mil | 1.9 | 0.99 | 11,200 copies[1] |
| B | Extracted | 500 CS | 8.5 mil | 0 | 1.3 | 9,400 Copies[1] |
| C | Extracted | None | 9.2 mil | 0 | 0.80 | 22,800 Copies No failure[2] |
| D | Non Extracted | None | 9.7 mil | 2.3 | 0.33 | 1 copy[3] |

[1] Failure due to crinkle. Variation between A and B tests is within the limits of exprimental error when considering copies to failure.
[2] No failure. Removed for other reasons.
[3] First copy wrapped around roll.

It can be determined that the release behavior of roll C, the extracted roll using no release fluid in the fuser assembly is equivalent to its oil saturated counterpart, roll A, the non-extracted fuser roll using a silicone oil release fluid. It is noted that fuser roll C was not removed because of release failure but was removed for other reasons. Since Rolls B and C were extracted, at the beginning of the fusing test there was 0%E in the rubber while Rolls A and D contained quantities of extractables (%E INITIAL PROPERTIES). Extractable materials were generated in Rolls B and C during operation (%E FINAL PROPERTIES). The size of the fuser roll in the release fixture was 7.6 cm in diameter.

The chloroform extract from Rolls B and C above was subjected to Gel Permeation Chromatography (GPC) analysis. The GPC curves showed low molecular weight polymeric residues present in the chloroform extract.

The foregoing Examples were conducted with a vinyl-containing polydimethylsiloxane gum coated and cured upon an aluminum cylinder as a base member. However, other similar materials are available, and the described and claimed extraction technique is deemed operable with other siloxane elastomer materials. Generally, the only major variation between silicone rubbers is the use of different amounts or types of filler materials and the variation in reactive cites upon the siloxane backbone. These variations are generally compensated for in the polymerization and curing of the rubber by techniques well known in the art. However, independent of whatever operation is required to vulcanize the silicone rubber upon a base member, the extraction technique of the present invention is deemed applicable. The exact conditions of curing for each particular siloxane material and optimum curing conditions for any particular material depend upon variables well-known in the art.

While the invention has been described with respect to preferred embodiments, it will be apparent that certain modifications and changes can be made without departing from the spirit and scope of the invention, and therefore, it is intended that the foregoing disclosure be limited only by the claims appended hereto.

What is claimed is:

1. The method of improving the release properties of a silicone rubber coated fuser member comprising placing a cured silicone rubber coated fuser member in an environment containing an organic solvent which dissolves low molecular weight polysiloxane and siloxane components in the cured silicone rubber which interfere with the release properties of the silicone rubber, the organic solvent being one which does not react with, degrade or dissolve the cured silicone rubber, and removing the organic solvent containing the dissolved low molecular weight polysiloxane and siloxane components from the cured silicone rubber coated fuser member.

2. The method of claim 1 wherein the environment contains the solvent in a liquid state.

3. The method of claim 1 wherein the environment contains the solvent in a vapor state.

4. The method of claim 1 wherein the solvent is chloroform.

5. The method of claim 1 wherein the solvent is carbon tetrachloride.

6. The method of claim 1 wherein the solvent is at an elevated temperature.

7. A method for improving the release properties of a fuser roll having a cylindrical core coated with a cured silicone rubber comprising placing the coated fuser roll in an environment containing an organic solvent specific for dissolving siloxanes and low molecular weight polysiloxanes in the cured silicone rubber, said solvent being a non-solvent for the cured silicone rubber and removing said organic solvent containing the dissolved siloxanes and low molecular weight polysiloxanes from the coated fuser roll.

8. The method of claim 7 wherein the environment contains the solvent in a vapor state.

9. The method of claim 7 wherein the environment contains the solvent in a liquid state.

* * * * *